United States Patent
Muta et al.

(10) Patent No.: US 9,546,303 B2
(45) Date of Patent: Jan. 17, 2017

(54) MOISTURE-PROOF MATERIAL

(75) Inventors: Shigeki Muta, Osaka (JP); Masatoshi Suzuki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 30 days.

(21) Appl. No.: 13/597,836

(22) Filed: Aug. 29, 2012

(65) Prior Publication Data
US 2013/0052461 A1    Feb. 28, 2013

Related U.S. Application Data

(60) Provisional application No. 61/528,930, filed on Aug. 30, 2011.

(51) Int. Cl.
*C09J 7/02* (2006.01)
*B32B 27/40* (2006.01)
*C09J 175/08* (2006.01)

(52) U.S. Cl.
CPC .......... *C09J 7/0282* (2013.01); *C08L 2201/02* (2013.01); *C08L 2201/14* (2013.01); *C09J 175/08* (2013.01); *C09J 2475/006* (2013.01); *Y10T 428/28* (2015.01); *Y10T 428/2896* (2015.01)

(58) Field of Classification Search
None
See application file for complete search history.

(56) References Cited

U.S. PATENT DOCUMENTS

| | | | |
|---|---|---|---|
| 3,940,513 A | 2/1976 | Anderson | |
| 5,516,581 A * | 5/1996 | Kreckel et al. | 428/317.3 |
| 5,606,005 A * | 2/1997 | Oshita | C08G 18/4238 528/83 |
| 6,726,971 B1 * | 4/2004 | Wong | 428/40.1 |
| 7,635,728 B2 * | 12/2009 | Diakoumakos et al. | 523/179 |
| 2004/0070156 A1 | 4/2004 | Smith et al. | |
| 2009/0110856 A1 * | 4/2009 | Gummaraju et al. | 428/35.7 |

FOREIGN PATENT DOCUMENTS

| | | |
|---|---|---|
| EP | 1 108 768 | 6/2001 |
| JP | 2005-272558 | 10/2005 |
| JP | 2006-142668 | 6/2006 |
| JP | 2011-105858 | 6/2011 |
| WO | 2008/085168 | 7/2008 |

OTHER PUBLICATIONS

European Search Report issued Apr. 4, 2014 in European Application No. 12 18 2361.
Office Action issued Apr. 8, 2015 in corresponding Chinese Application No. 201210316421.6, with English translation.
Office Action issued May 10, 2016 in corresponding Japanese Application No. 2012-188498, with English translation.
Notice of Reasons for Refusal issued Oct. 18, 2016 in corresponding Japanese Application No. 2012-188498, with English translation.

* cited by examiner

*Primary Examiner* — Alexandre Ferre
(74) *Attorney, Agent, or Firm* — Wenderoth, Lind & Ponack, L.L.P.

(57) ABSTRACT

The present invention relates to a moisture-proof material having a polyurethane film substrate and an adhesive layer formed on at least one surface of the substrate, which material shows a tensile strength of not less than 7500 psi, and an elongation at break of not less than 550%.

6 Claims, 1 Drawing Sheet

MOISTURE-PROOF MATERIAL

This application claims the benefit of U.S. Provisional Application No. 61/528,930 filed on Aug. 30, 2011.

TECHNICAL FIELD OF THE INVENTION

The present invention relates to a moisture-proof material to be directly adhered to various members to be protected from moisture, particularly, a moisture-proof material preferable for direct adhesion to a floor panel for transportation vehicles, such as airplane, boat, ship and the like, building structures and the like, to prevent exposure of the floor panel to moisture and humidity.

BACKGROUND OF THE INVENTION

For example, carpets made of various materials and forms are generally installed on the floor of transportation vehicles, such as airplane, boat, ship and the like, building structures and the like for the purpose of ensuring walkability, good appearance, heat retaining property and the like. For example, since electrical components, electric wiring and the like are set under the floor panel of airplanes; it is necessary to shut off the moisture and humidity from the floor panel (that is, moisture-proof) so that the moisture will not penetrate under the floor panel. However, since the floor panel is fixed onto the body frame by bolting, it is difficult to completely prevent moisture permeation from the clearance between a bolt and a screw hole formed for bolting a floor panel, even when the bolt is screwed into the screw hole. For this reason, a highly moisture-proof adhesive sheet is adhered to a floor panel before installing a carpet, and then the carpet is installed on the floor panel. In addition, since the planar shape of the floor in airplanes, boats, ships, houses and the like is not necessarily regular, covering the whole floor surface with one sheet of carpet is difficult, and generally, plural sheets of carpets are connected and installed. Thus, even when the carpet is made of a highly moisture-proof material, moisture may sometimes reach the floor from the joint of the carpets. Therefore, a highly moisture-proof adhesive tape or adhesive sheet is attached in advance to at least the part of the floor panel that comes under the joint of the carpets, after which the carpets are installed. As such highly moisture-proof adhesive tape, for example, an adhesive tape using polyether-based polyurethane (US-A-2004/0070156) is known.

However, the present inventors have studied and found that the adhesive tape described in US-A-2004/0070156 is easily stretchable and difficult to achieve linearity on adhesion. That is, the adhesive tape cannot be easily adhered linearly while maintaining the width thereof, and therefore, adhesion of the adhesive tape to a part to be kept moisture-free with good workability and certainty is difficult. In addition, the presence of the problem of easy occurrence of adhesive residue by detaching the adhesive tape from a floor panel for maintenance and the like has been noted.

SUMMARY OF THE INVENTION

The present invention has been made in consideration of the above-mentioned situation, and the problem to be solved thereby is provision of a moisture-proof material superior in linearity on adhesion. In addition, it is provision of a moisture-proof material superior in linearity on adhesion, which hardly leaves adhesive residue when detached.

The present inventors have conducted intensive studies in an attempt to solve the above-mentioned problems, and found that the linearity on adhesion of a moisture-proof material in the form of an adhesive tape or adhesive sheet is closely related to the tensile strength and elongation at break thereof, and those values above given levels can sufficiently increase the linearity on adhesion of the moisture-proof material. Further studies conducted based on said finding have resulted in the completion of the present invention.

Accordingly, the present invention has the following characteristics.

(1) A moisture-proof material comprising a polyurethane film substrate and an adhesive layer formed on at least one surface of the substrate, which has a tensile strength of not less than 7500 psi and an elongation at break of not less than 550%.

(2) The moisture-proof material of the above-mentioned (1), wherein the polyurethane film substrate is a polyester-based polyurethane film substrate.

(3) The moisture-proof material of the above-mentioned (1) or (2), wherein the adhesive layer comprises a polyurethane adhesive.

(4) The moisture-proof material of the above-mentioned (3), wherein the polyurethane adhesive is a polyether-based polyurethane adhesive.

(5) The moisture-proof material of the above-mentioned (3) or (4), wherein the polyurethane adhesive comprises a curing agent.

(6) The moisture-proof material of any one of the above-mentioned (1) to (5), wherein the adhesive layer comprises a flame-retardant at a content of less than 5 wt %.

(7) The moisture-proof material of any one of the above-mentioned (1) to (6), which has a moisture vapor transmission rate of not more than 9.0%.

(8) The moisture-proof material of any one of the above-mentioned (1) to (7), which has a moisture absorption rate of not more than 1.0%.

(9) The moisture-proof material of any one of the above-mentioned (1) to (8), wherein the tensile strength is not more than 15000 psi.

(10) The moisture-proof material of any one of the above-mentioned (1) to (9), wherein the elongation at break is not more than 1500%.

(11) The moisture-proof material of any one of the above-mentioned (1) to (10), which shows a burning time of not more than 15 sec, a burning length of not more than 8 inch, and a burning time of a fallen burnt material of not more than 5 sec, in a flammability test.

According to the present invention, a moisture-proof material superior in the linearity on adhesion can be provided. In addition, a moisture-proof material superior in the linearity on adhesion and hardly leaving adhesive residue after detachment can be provided.

Figure 1:
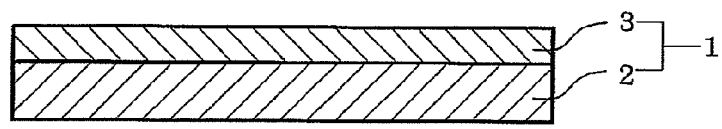
FIG. 1 is a schematic sectional view of one embodiment of the moisture-proof material of the present invention.

In the drawings, 1 is a moisture-proof material, 2 is a polyurethane film substrate, 3 is an adhesive layer, 10 is a floor panel, 11 is a carpet, 12 is a double-faced adhesive tape or sheet, 50 is an adherend, 51 is a spring balance, and T is a tape.

DESCRIPTION OF EMBODIMENTS

The present invention is explained in the following by referring to preferable embodiments thereof.

As shown in FIG. 1, a moisture-proof material 1 of the present invention comprises a polyurethane film substrate 2 and an adhesive layer 3 formed on at least one surface of the substrate 2. The moisture-proof material 1 of the present invention shows the properties of tensile strength of not less than 7500 psi and elongation at break of not less than 550%, wherein 1 psi is about 6.89 kPa.

Figure 2:
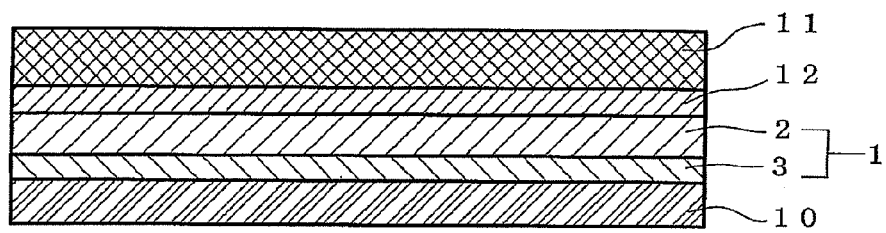
FIG. 2 is a schematic view of one embodiment wherein a moisture-proof material is interposed between a floor panel and a carpet.
Figure 3:
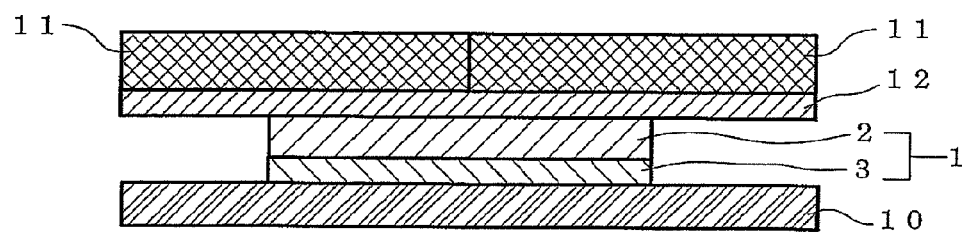
FIG. 3 is a schematic view of another embodiment wherein a moisture-proof material is interposed between a floor panel and a carpet.

Generally, the moisture-proof material 1 of the present invention is directly adhered to a floor panel 10 when a carpet 11 is installed on the floor panel 10, such that it is interposed between the floor panel 10 and the carpet 11, as shown in FIGS. 2 and 3. FIG. 2 shows an example wherein the moisture-proof material is applied to be the sheet under the entire carpet 11, and FIG. 3 shows an example wherein the moisture-proof material is applied under the joint of the carpet. As shown in FIGS. 2 and 3, a double-faced adhesive tape or sheet 12 is generally adhered to the undersurface of the carpet 11, and the double-faced adhesive tape or sheet 12 is adhered to a polyurethane film substrate 2 of the moisture-proof material 12.

In the present specification, the "floor panel" means a panel forming a floor (that is, a basal plane horizontally comparting a space in transportation vehicles and building structures), which is made of, for example, various materials such as materials made from particular fiberglass reinforced plastic (GFRP), and carbon fiber reinforced plastic (CFRP) and the like. The "carpet" is a concept encompassing not only general textile floor covering but also various cover materials used to cover floor surfaces, such as vinyl chloride tile, olefin-based sheet, linoleum sheet, flooring material and the like.

[Polyurethane Film Substrate]

While the polyurethane constituting the polyurethane film substrate 2 is not particularly limited, polyether-based polyurethane wherein the polyol component consists of polyether polyol, polyester-based polyurethane wherein the polyol component consists of polyester polyol, polycarbonate-based polyurethane wherein the polyol component consists of polycarbonate polyol and the like can be mentioned. Of these, polyester-based polyurethane is preferable from the aspects of strength, heat resistance and anchor property with an adhesive.

Examples of the polyol component of polyester-based polyurethane include polyester polyol comprised of a polycondensate of alcohols such as ethylene glycol, diethylene glycol, propylene glycol, butylene glycol, hexamethylene glycol, 1,4-butanediol, 1,6-hexanediol, 1,9-nonanediol, 2-methyl-1,3-propanediol, neopentyl glycol, 3-methyl-1,5-pentanediol and the like, and a dibasic acid such as adipic acid, azelaic acid, sebacic acid and the like, polycaprolactone polyol and the like. One or more kinds of polyol component can be used. From the aspect of water resistance of the moisture-proof material, polyester polyol comprised of polycondensate of one or more kinds of alcohols selected from the group consisting of 1,9-nonanediol, 2-methyl-1,3-propanediol, neopentyl glycol and 3-methyl-1,5-pentanediol, and one or more kinds of dibasic acid selected from the group consisting of adipic acid, azelaic acid and sebacic acid is(are) preferable.

As the polyisocyanate component of polyester-based polyurethane, a known aliphatic, alicyclic or aromatic organic isocyanate compound having two or more isocyanate groups in one molecule can be used.

Examples of the aliphatic isocyanate compound include aliphatic diisocyanates such as butane-1,4-diisocyanate, hexamethylene diisocyanate, isopropylene diisocyanate, methylene diisocyanate, 2,2,4-trimethylhexamethylene diisocyanate, lysine diisocyanate, dimer diisocyanate wherein carboxyl group of dimer acid is inverted to an isocyanate group and the like. In addition, examples of the alicyclic isocyanate compound include alicyclic diisocyanates such as cyclohexane-1,4-diisocyanate, isophorone diisocyanate, norbornane diisocyanate, dicyclohexylmethane-4,4'-diisocyanate, 1,3-bis(isocyanatomethyl)cyclohexane, methylcyclohexane diisocyanate and the like. Furthermore, examples of the aromatic isocyanate compound include aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, m-tetramethylxylylene diisocyanate and the like. As the polyisocyanate component, a trifunctional or more polyisocyanate compound such as adduct, isocyanurate, biuret and the like can also be used. One or more kinds of polyisocyanate component can be used.

The polyisocyanate component is preferably an aliphatic and/or alicyclic isocyanate compound(s), from the aspect of yellowing resistance.

One or more kinds of polyurethane can be used for constituting the polyurethane film substrate. While the average molecular weight of polyurethane is not limited, the number average molecular weight (Mn) is generally 5,000-500,000, preferably 10,000-300,000.

The polyurethane film substrate is prepared by, for example, heat-melting and extrusion-molding polyurethane pellets, or forming polyurethane pellets into a film by a method such as calendering and the like.

While the thickness of the polyurethane film substrate is not particularly limited, it is preferably 4-16 mil, more preferably 4-10 mil, particularly preferably 4-9 mil, wherein 1 mil is about 25.4 μm, from the balance between low weight of the moisture-proof material and the linearity on adhesion of the moisture-proof material.

As the polyurethane film substrate, a commercially available product can be used. Examples of the polyether-based polyurethane film substrate include MT2001 manufactured by American Polyfilm, Inc. (thickness 7 mil) and the like. Examples of the polyester-based polyurethane film substrate include VLM4001 (thickness 4 mil), VLM3301 (thickness 7 mil) and VLM 3301 (thickness 10 mil), each manufactured by American Polyfilm, Inc., and the like.

[Adhesive Layer]

As an adhesive layer 3 formed on at least one surface of the polyurethane film substrate 2, for example, a polyurethane adhesive, an acrylic adhesive, a rubber-based adhesive and the like can be used. However, since transportation vehicles such as airplanes, boats, ships and the like, and indoor materials for building structures and the like are requested to have flame retardance, a polyurethane adhesive is preferable since it has flame retardance, removability, long-term durability and the like.

As polyurethane adhesive (A), an adhesive composition obtained by adding polyisocyanate curing agent (B) to polyurethane (A1) which is a reaction product of polyisocyanate (a1) and polyol (a2), or polyurethane (A2) obtained by reacting polyisocyanate (a1), polyol (a2), and dihydroxycarboxylic acid (a3) having two hydroxyl groups and one carboxyl group in one molecule (that is, the "curing agent-containing polyurethane adhesive") can be used.

Polyisocyanate (a1) can be divided into aromatic polyisocyanate, aliphatic polyisocyanate, araliphatic polyisocyanate, and alicyclic polyisocyanate. Examples of the aromatic polyisocyanate include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatotoluene, 1,3,5-triisocyanatobenzene, dianisidine diisocyanate, 4,4'-diphenylether diisocyanate, 4,4',4''-triphenylmethane triisocyanate and the like. Examples of the aliphatic polyisocyanate include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate and the like. Examples of the araliphatic polyisocyanate include ω,ω'-diisocyanato-1,3-dimethylbenzene, ω,ω'-diisocyanato-1,4-dimethylbenzene, ω,ω'-diisocyanato-1,4-diethylbenzene, p-tetramethylxylylene diisocyanate, m-tetramethylxylylene diisocyanate and the like. Examples of the alicyclic polyisocyanate include 3-isocyanatomethyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexylisocyanato), 1,4-bis(isocyanatomethyl)cyclohexane and the like. In addition, polyisocyanate (a1) may be an adduct, an isocyanurate, a biuret and the like of the compounds exemplified above. Only one kind of polyisocyanate (a1) may be used, or two or more kinds thereof may be used in combination.

Examples of the polyol (a2) include polyester polyol (a2-1), polyether polyol (a2-2) and the like.

Polyester polyol (a2-1) is obtained by reacting a polyvalent carboxylic acid component and a polyol component. Examples of such polyvalent carboxylic acid component include terephthalic acid, adipic acid, azelaic acid, sebacic acid, phthalic anhydride, isophthalic acid, trimellitic acid and the like.

Examples of the above-mentioned polyol component include ethylene glycol, propylene glycol, diethylene glycol, butylene glycol (e.g., 1,4-butanediol), hexene glycol (e.g., 1,6-hexanediol), 3-methyl-1,5-pentanediol, 3,3'-dimethylol heptane, polyoxyethylene glycol, polyoxypropylene glycol, neopentyl glycol, butylethylpentanediol, glycerol, trimethylolpropane, pentaerythritol, as well as polyester polyol wherein lactones are open ring polymerized, such as polycaprolactone, poly(β-methyl-γ-valerolactone), polyvalerolactone etc. and the like.

Polyether polyol (a2-2) can be obtained by polymerizing an oxirane compound by using a low molecular weight polyol as an initiator. Examples of the above-mentioned oxirane compound include ethylene oxide, propylene oxide, butylene oxide, tetrahydrofuran and the like. Examples of the above-mentioned low molecular weight polyol include propylene glycol, ethylene glycol, glycerol, trimethylolpropane and the like.

One or more kinds of polyol (a2) can be used in combination. In addition, polyol (a2) having a low molecular weight to a high molecular weight can be used. Preferably, the number average molecular weight (Mn) is 500-20,000, more preferably 500-10,000.

Examples of dihydroxycarboxylic acid (a3) having two hydroxyl groups and one carboxyl group in one molecule [hereinafter sometimes to be indicated as dihydroxycarboxylic acid (a3)] include aliphatic dihydroxycarboxylic acids such as dihydroxyfumaric acid, dihydroxymaleic acid, 2,2-bis(hydroxymethyl)ethane acid (alias, dimethylol acetic acid), 2,3-dihydroxypropane acid (alias, glyceric acid), 2,2-bis(hydroxymethyl)propanoic acid (alias, 2,2-dimethylol propionic acid), 3,3-bis(hydroxymethyl)propanoic acid (alias, 3,3-dimethylol propionic acid), 2,3-dihydroxy-2-methylpropane acid, 2,2-bis(hydroxymethyl)butanoic acid (alias, dimethylol butyric acid), 2,2-dihydroxybutane acid (alias, 2,2-dimethylol butane acid), 2,3-dihydroxybutane acid, 2,4-dihydroxybutane acid (alias, 3-deoxytetronic acid), 3,4-dihydroxybutane acid, 2,4-dihydroxy-3,3-dimethylbutane acid, 2,3-dihydroxy-2-methylbutane acid, 2,3-dihydroxy-2-ethylbutane acid, 2,3-dihydroxy-2-isopropylbutane acid, 2,3-dihydroxy-2-butylbutane acid, (R)-2,4-dihydroxy-3,3-dimethylbutane acid (alias, pantoic acid), 2,3-dihydroxybutanedioic acid (alias, tartaric acid), 2,2-bis(hydroxymethyl)pentane acid (alias, dimethylol valeric acid), 3,5-dihydroxy-3-methylpentane acid (alias, mevalonic acid), 2,2-bis(hydroxymethyl)hexane acid (alias, dimethylol caproic acid), 2,2-bis(hydroxymethyl)heptane acid (alias, dimethylol enanthic acid), 3,5-dihydroxyheptane acid, 2,2-bis(hydroxymethyl)octanoic acid (alias, dimethylol caprylic acid), 2,2-bis(hydroxymethyl)nonane acid (alias, dimethylol pelargonic acid), 2,2-bis(hydroxymethyl)decane acid (alias, dimethylol capric acid), 2,2-bis(hydroxymethyl)dodecane acid (alias, dimethylol lauric acid), 2,2-bis(hydroxymethyl)tetradecane acid (alias, dimethylol myristic acid), 2,2-bis(hydroxymethyl)pentadecane acid, 2,2-bis(hydroxymethyl)hexadecane acid (alias, dimethylol palmitic acid), 2,2-bis(hydroxymethyl)heptadecane acid (alias, dimethylol margaric acid), 2,2-bis(hydroxymethyl)octadecane acid (alias, dimethylol stearic acid), dimethylol oleic acid, dimethylol linoleic acid, dimethylol linolenic acid, dimethylol arachidonic acid, dimethylol docosahexaenoic acid, dimethylol eicosapentaenoic acid and the like; aromatic ring or hetero ring-containing dihydroxycarboxylic acids such as 2,3-dihydroxybenzoic acid (alias, o-pyrocatechuic acid), 2,4-dihydroxybenzoic acid (alias, β-resorcin acid), 2,5-dihydroxybenzoic acid (alias, gentisic acid), 2,6-dihydroxybenzoic acid (alias, γ-resorcin acid), 3,4-dihydroxybenzoic acid (alias, protocatechuic acid), 3,5-dihydroxybenzoic acid (alias, α-resorcin acid), 2,6-dihydroxy-4-methylbenzoic acid, 2,4-dihydroxy-6-methylbenzoic acid (alias, o-orsellinic acid), 3,5-dihydroxy-4-methylbenzoic acid, 2,4-dihydroxy-3,6-dimethylbenzoic acid, 2,3-dihydroxy-4-methoxybenzoic acid, 3,4-dihydroxy-5-methoxybenzoic acid, 2,4-di(hydroxymethyl)benzoic acid, 3,4-di(hydroxymethyl)benzoic acid, 4-bromo-3,5-dihydroxybenzoic acid, 5-bromo-2,4-dihydroxybenzoic acid, 3-chloro-2,6-dihydroxybenzoic acid, 5-chloro-2,4-dihydroxybenzoic acid, hydroxy(4-hydroxy-3-methoxyphenyl)acetic acid (alias, vanilmandelic acid), D,L-3,4-dihydroxymandelic acid, 2,5-dihydroxyphenylacetic acid (alias, homogentisic acid), 3,4-dihydroxyphenylacetic acid (alias, homoprotocatechuic acid), 3,4-(methylenedioxy)phenylacetic acid, 3-(3,4-dihydroxyphenyl)propanoic acid (alias, hydrocaffeic acid), 3-(2,4-dihydroxyphenyl)acrylic acid (alias, umbellic acid), 3-(3,4-dihydroxyphenyl)acrylic acid (alias, caffeic acid), 4,4'-bis(p-hydroxyphenyl)pentane acid, 3-(3,4-methylenedioxyphenyl)propionic acid, 2,4-dihydroxycinnamic acid, 2,5- dihydroxycinnamic acid, cinnamyl-3,4-dihydroxy-α-cyanocinnamic acid, 2-bromo-4,5-methylenedioxycinnamic acid, 3,4-methylenedioxycinnamic acid, 4,5-methylenedioxy-2-nitrocinnamic acid, 2,6-dihydroxyisonicotinic acid, DL-3,4-dihydroxymandelic acid, 1,4-dihydroxy-2-naphthalenecarboxylic acid, 3,5-dihydroxy-2-naphthalenecarboxylic acid, 3,7-dihydroxy-2-naphthalenecarboxylic acid, 4,8-dihydroxyquinoline-2-carboxylic acid (alias, xanthurenic acid), 3-(3,4-dihydroxyphenyl)propionic acid, 2,4-dihydroxypyrimidine-5-carboxylic acid, 2,6-dihydroxypyridine-4-carboxylic acid (alias, citrazinic acid), 2,4-dihydroxythiazole-5-acetic acid, 2-(1-thienyl)ethyl-3,4-dihydroxybenzylidenecyanoacetic acid, dipropionic acid-6-estradiol, 2,5-dihydroxy-1,4-benzene diacetic acid, (2R,3R)-2,3-dihydroxy-3-(phenylcarbamoyl)propionic acid and the like, and the like.

Since dihydroxycarboxylic acid (a3) has two hydroxyl groups, it is subjected to polyaddition with polyisocyanate (a1) (urethane reaction) as a hydroxyl group component to produce polyurethane (A2), similar to the aforementioned polyol (a2). In addition, a carboxyl group derived from a dihydroxycarboxylic acid (a3) becomes the carboxyl group on the side chain of polyurethane (A2).

Two hydroxyl groups in dihydroxycarboxylic acid (a3) are both preferably bonded to the primary carbon atom, since activity is high in the urethane reaction. On the other hand, when the carboxyl group in dihydroxycarboxylic acid (a3) functions as a reaction component in the urethane reaction, gelling easily occurs during the reaction, and even when urethane resin (Ax) is obtained without gelling, it may easily coagulate partially. During the urethane reaction, therefore, the carboxyl group in dihydroxycarboxylic acid (a3) is preferably bonded to the secondary or tertiary carbon atom so that the dihydroxycarboxylic acid (a3) will exclusively function as a hydroxyl group component and the carboxyl group will not function as a reaction component in the urethane reaction. The dihydroxycarboxylic acid (a3) can have one carboxyl group bonded to the secondary carbon atom or tertiary carbon atom in one molecule. The carboxyl group in dihydroxycarboxylic acid shows a catalytic action to promote the urethane reaction.

Thus, using a compound having two primary hydroxyl groups and one carboxyl group bonded to the secondary or tertiary carbon atom in one molecule from among the dihydroxycarboxylic acid (a3), polyurethane (A2) that does not easily permit partial coagulation, is rich in uniformity, and shows good flowability can be obtained. When the below-mentioned polyisocyanate curing agent (B) is mixed with such polyurethane (A2), an adhesive composition having a comparatively long pot life, which can form an adhesive layer with rich cohesion strength after curing, can be obtained.

Polyurethane (A2) preferably has an acid number of 20-80 mg KOH/g.

As the polyisocyanate curing agent (B), a compound of trifunctional or above from among the compounds exemplified as the aforementioned polyisocyanate (a1) can be mentioned. Particularly, at least one selected from trimethylolpropane adduct, biuret, and isocyanurate of a diisocyanate compound is preferable. Of those, more preferred are trimethyloipropane adduct, biuret, and isocyanurate of tolylene diisocyanate, isophorone diisocyanate or xylylene diisocyanate.

Polyurethane (A2) preferably contains 1-25 wt % of a structure derived from dihydroxycarboxylic acid (a3). That is, the amount of the carboxyl group to be introduced into the side chain depends on the structure derived from dihydroxycarboxylic acid (a3). The carboxyl group introduced into the side chain is crosslinked with the below-mentioned polyisocyanate curing agent (B) to form an adhesive layer, which contributes to the improvement of cohesion strength, adhesiveness, heat resistance and resistance to moist heat. However, when the amount of the carboxyl group introduced by dihydroxycarboxylic acid (a3) is too much, the pot life of the adhesive composition becomes short. In view of the balance between the pot life of the adhesive composition and the property of the adhesive layer, the structure derived from dihydroxycarboxylic acid (a3) is particularly preferably 5-20 wt % of polyurethane (A2).

Polyurethane adhesive (A) is more preferably a polyether-based polyurethane adhesive obtained using polyether polyol (a2-2) as polyol (a2) than a polyester-based polyurethane adhesive obtained using polyester polyol (a2-1) as polyol (a2), from the aspects of flame retardance, moisture-proof property, flexibility, adhesion and the like of the moisture-proof material.

When an adhesive composition obtained by adding polyisocyanate curing agent (B) to polyurethane (A2) obtained by reacting polyisocyanate (a1), polyol (a2), and dihydroxycarboxylic acid (a3) having two hydroxyl groups and one carboxyl group in one molecule is used as polyurethane adhesive (A), the curing conditions are preferably 80-140° C.×1-5 min.

Polyurethane generally expresses adhesiveness at an elastic modulus of about $10^6$ Pa or below. The elastic modulus (room temperature) of polyurethane adhesive (A) is not more than about $10^6$ Pa, which is lower than that of polyurethane film substrate.

While the thickness of the adhesive layer 3 is not particularly limited, it is preferably 2-5 mil from the aspects of the moisture-proof property of the moisture-proof material, workability of re-adhesion of the moisture-proof material (prevention of adhesive residue). When it is not less than 2 mil, the moisture-proof property of the moisture-proof material is more improved, and when it is not more than 5 mil, workability of re-adhesion of the moisture-proof material (prevention of adhesive residue) becomes more advantageous.

[Flame-retardant]

In the moisture-proof material of the present invention, the adhesive layer 3 may contain a flame-retardant. However, substantial absence thereof is preferable.

While the flame-retardant is not particularly limited, a non-halogen flame-retardant is preferable from the environmental aspects. Known examples of the non-halogen flame-retardant include hydrated metal compound-based flame-retardant, inorganic compound-based flame-retardant, phosphorus flame-retardant, silicone-based flame-retardant, nitrogen compound-based flame-retardant and organic metal compound-based flame-retardant. Particularly, a phosphorus flame-retardant is preferable since it is superior in flame retardance-imparting effect, suppression of drip during burning, compatibility to environmental regulations and the like.

Examples of the hydrated metal compound-based flame-retardant include aluminum hydroxide, magnesium hydroxide, calcium hydroxide and the like. Examples of the inorganic compound-based flame-retardant include antimony compound, zinc borate, zinc stannate, molybdenum compound, zinc oxide, zinc sulfide, zeolite, titanium oxide, nanofiller (montmorillonite (MMT), nano hydrated metal compound, silica), carbon nanotube, calcium carbonate and the like.

Examples of the phosphorus flame-retardant include phosphate esters, aromatic condensed phosphate esters, ammonium polyphosphates and the like. Specific examples of phosphate esters include triphenyl phosphate, tricresyl phosphate (TCP), cresyldiphenyl phosphate (CDP), 2-ethylhexyldiphenyl phosphate, triethyl phosphate (TEP), tri-n-butyl phosphate, trixylenyl phosphate, xylenyldiphenyl phosphate (XDP) and the like. Specific examples of aromatic condensed phosphate esters include resorcinol bisdiphenyl phosphate, bisphenol A bis(diphenyl phosphate), resorcinol bis(dixylenyl phosphate) and the like. Specific examples of ammonium polyphosphates include ammonium polyphosphate (APP), melamine-modified ammonium polyphosphate and coated ammonium polyphosphate. Here, coated ammonium polyphosphate is obtained by coating or microencapsulating ammonium polyphosphate with a resin to improve water resistance. The phosphate esters, aromatic condensed phosphate esters and ammonium polyphosphates can be used in combination. From among these, a combined use of a phosphate ester and an ammonium polyphosphate is preferable, since both the solid phase and the gaseous phase can be made flame-retardant by a combination of a flame retardance effect by char layer formation by the phosphate ester and a flame retardance effect by inert gas generation by the ammonium polyphosphate.

Examples of the silicone-based flame-retardant include dimethyl silicone, amino-modified silicone, epoxy-modified silicone and the like.

Examples of the nitrogen compound-based flame-retardant include a hindered amine compound, melamine cyanurate, a triazine compound, a guanidine compound and the like.

Examples of the organic metal compound-based flame-retardant include copper ethylenediaminetetraacetate, calcium perfluorobutanesulfonate and the like.

One or more kinds of flame-retardants can be used in combination. While the amount of the flame-retardant to be used varies depending on the kind of the flame-retardant, generally, it is preferably less than 5 wt %, more preferably less than 3 wt %, still more preferably less than 2 wt %, particularly preferably less than 1 wt %, of the whole moisture-proof material, from the aspects of transparency of the moisture-proof material and suppression of decrease of the cohesion strength of the adhesive layer. When a flame-retardant is mixed in a proportion of not less than 5 wt % of the whole moisture-proof material, transparency of the moisture-proof material decreases, and observation of the surface targeted for adhesion (adhered surface) through the moisture-proof material becomes difficult in an adhesion work, which tend to decrease the adhesion workability.

[Release Liner]

In the moisture-proof material of the present invention, a release liner may be laminated on adhesive layer 3 until use, to protect the surface of the adhesive layer 3, suppress a decrease of the adhesive force of the adhesive layer and the like. Such release liner is detached when the moisture-proof material is adhered to the adhered surface of a floor panel and the like.

Examples of the above-mentioned release liner include a release liner wherein a release-treated layer is formed on at least one surface of a substrate (substrate for release liner), a release liner consisting of a low adhesive substrate made of a fluorinated polymer (e.g., polytetrafluoroethylene, polychlorotrifluoroethylene, polyvinyl fluoride, polyvinylidene fluoride, tetrafluoroethylene-hexafluoropropylene copolymer, chlorofluoroethylene-vinylidene fluoride copolymer and the like) or a nonpolar polymer (e.g., olefin-based resin such as polyethylene, polypropylene and the like, and the like), and the like.

Examples of the above-mentioned substrate (substrate for release liner) include plastic films (synthetic resin films) such as a polyester film (poly(ethylene terephthalate) film and the like), an olefin-based resin film (polyethylene film, polypropylene film and the like), a polyvinyl chloride film, a polyimide film, a polyamide film (nylon film), a rayon film and the like, paper (quality paper, Japanese paper, craft paper, glassine, synthetic paper, topcoat paper and the like), multi-layered products (2-3 layer composites) thereof by lamination, coextrusion and the like, and the like. While the release agent to be used for the release-treated layer is not particularly limited, for example, silicone-based release agents, fluorinated release agents, long chain alkyl-based release agents and the like can be used. The release agent may be used alone or two or more kinds thereof can be used in combination.

The moisture-proof material of the present invention has a tensile strength of not less than 7500 psi and an elongation at break of not less than 550%. With such mechanical properties, it shows superior linearity on adhesion. The linearity on adhesion means easiness of adhesion of the moisture-proof material straightly on an adhered surface, which can be evaluated by the following method.

(Test of Linearity on Adhesion)

Figure 4:
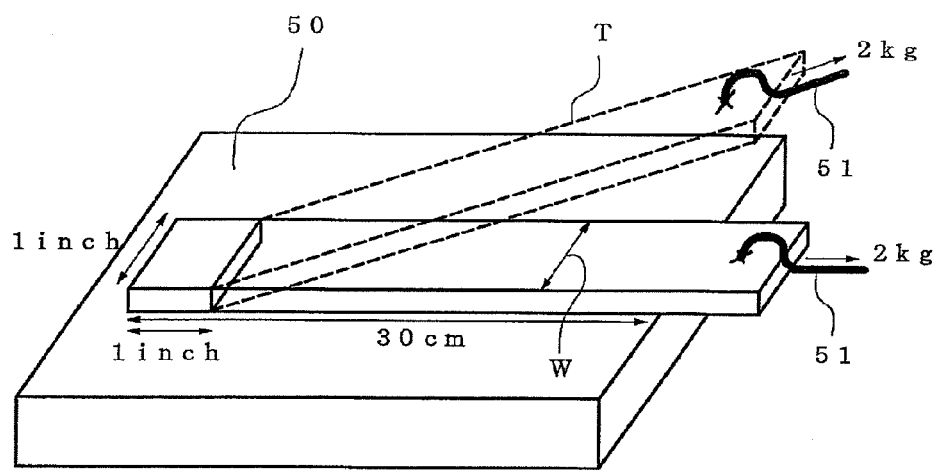
FIG. 4 is a schematic view of an evaluation test of the linearity on adhesion of a moisture-proof material.

As shown in FIG. 4, tape T (width 1 inch, length 40 cm) is prepared, one terminal portion (length 1 inch part) of the tape T is adhered to an adherend 50, 30 cm in length of the tape T is adhered to the adherend 50 while pulling the other terminal portion in the tape axis direction with 2 kg force, and a width (W) of the minimum width part of the tape T adhered to the adherend 50 is measured. A smaller decrease of the width (W) of the minimum width part relative to the width (1 inch) of the tape before the test means more superior linearity on adhesion. Here, 1 inch is about 2.54 cm.

The tensile strength of the moisture-proof material is preferably not less than 8100 psi, more preferably not less than 8500 psi. The elongation at break is preferably not less than 650%, more preferably, not less than 775%. The tensile strength of the moisture-proof material is preferably not more than 15000 psi for the flexibility of the moisture-proof material, and the elongation at break of the moisture-proof material is preferably not more than 1500% for the workability of the adhesion work of the moisture-proof material.

The tensile strength and elongation at break of the moisture-proof material can be measured by a measurement method according to ASTM D3759. The "ASTM D3759" and the like are standards developed by the ASTM INTERNATIONAL.

Polyester-based polyurethane generally has a higher strength than polyether-based polyurethane, and a polyester-based polyurethane film substrate has a comparatively thin thickness and a high tensile strength. Therefore, using a polyester-based polyurethane film substrate as the polyurethane film substrate, a moisture-proof material having a light weight and superior in the linearity on adhesion can be obtained. In addition, a film made of polyester-based polyurethane is superior to a film made of polyether-based polyurethane in the adhesiveness to an adhesive (particularly polyurethane adhesive). Using a polyester-based polyurethane film substrate as the polyurethane film substrate, therefor, adhesive residue by detaching the moisture-proof material from an adhered surface such as a floor panel and the like for maintenance and the like after adhering the moisture-proof material to the adhered surface does not occur easily.

While the moisture-proof material of the present invention has a comparatively thin thickness, it shows desired good linearity on adhesion. Therefore, the weight thereof can be easily made small, has a weight per unit area of preferably not more than 1.2 oz/sqft, more preferably not more than 1.0 oz/sqft. When the weight per unit area is not more than 1.2 oz/sqft, it can be particularly preferably used as a moisture-proof material for transportation vehicles such as airplanes, boats, ships and the like. Here, 1 oz/sqft is about 305 g/m$^2$.

The moisture-proof material of the present invention is used by direct adhesion to an object to be protected from moisture such as a floor panel and the like. The adhesive force thereof is preferably not less than 5.0 lbs/inch at room temperature and humidity 50% RH, preferably not less than 7.5 lbs/inch at 160° F. (71.1° C.) and humidity 50% RH, and preferably not less than 5.0 lbs/inch at 120° F. (48.9° C.) and humidity 95% RH. Such adhesive force can be measured by a measurement method according to ASTM D1000. Here, 1 lbs/inch is about 17.9 kg/m.

The moisture-proof material of the present invention does not permit easy moisture permeation, does not absorb moisture easily, has a moisture vapor transmission rate of preferably not more than 9.0%, more preferably not more than 4.1%, and a moisture absorption rate of preferably not more than 1.0%, more preferably not more than 0.5%. The moisture vapor transmission rate can be measured by a measurement method according to ASTM D3833, and the moisture absorption rate can be measured by the measurement method described in the following Examples. The measurement methods of both the moisture vapor transmission rate and the moisture absorption rate are explained in detail below.

While a moisture-proof material used for transportation vehicles such as airplanes, boats, ships and the like is required to show particularly high moisture-proof property, the moisture-proof material of the present invention can sufficiently meet the requirement.

The moisture-proof material of the present invention shows superior flame retardance even without mixing a flame-retardant. The moisture-proof material of the present invention shows a burning time of preferably within 2 sec, more preferably within 1 sec, a burning length of not more than 5 inch, more preferably not more than 3.5 inch, and a burning time of a fallen burnt material of 0 sec, in a BSS7230 flammability test. The "BSS7230" is a standard published by The Boeing Company.

Generally, a carpet to cover a floor surface is, as shown in FIGS. 2 and 3, adhered to a moisture-proof material, or adhered to a moisture-proof material and a floor panel via a double-faced adhesive tape. Such double-faced adhesive tape generally has a substrate thickness of about 100 µm, and a total tape thickness of about 300 µm. Generally, a substrate made of a cotton material containing a flame-retardant having an adhesive layer made of a rubber-based adhesive containing a flame-retardant formed thereon is used for hand-tearability. When the polyurethane film substrate of the moisture-proof material of the present invention is a polyester-based polyurethane film substrate, adhesiveness to a double-faced adhesive tape can be more improved.

EXAMPLES

The present invention is explained in more detail in the following by referring to Examples and Comparative Examples.

The evaluation test of the moisture-proof materials in the Examples and Comparative Examples were performed by the following methods.

1. Thickness, Weight

Weight: After standing at 24±2 hr, 75±5° F. [i.e., 70° F. (21.1° C.)-80° F. (26.7° C.)], the weight of a 2×3 inch sample having a rectangular planar shape was measured by a scale (minimum scale 0.001 g), and the average of 5 samples was taken.

Thickness: Measured by a dial thickness gage with minimum scale of 0.0005 inch, which applies a pressure of 7.0-9.0 psi to a measured substance.

2. Adhesive Force, Anchor Property (Adhesive Residue)

According to ASTM D1000, under the conditions of (i) room temperature×humidity 50% RH, (ii) 160° F.×humidity 50% RH, and (iii) 120° F.×humidity 95% RH, a 180° peel strength was measured, and the 180° peel strength was taken as the adhesive force. As the adherend, a honeycomb adherend (BMS4-17) was used. For anchor property, the adherend after measurement of 180° peel strength was visually observed, and the presence or absence of adhesive residue was examined.

3. Tensile Strength and Elongation at Break

Measured according to ASTM D3759.

To be specific, tensile strength and elongation at break were measured under the conditions of 12.5 mm sample width, distance between chucks 50 mm, tension speed 50 mm/min.

4. Flammability Test

Performed according to BSS7230.

To be specific, one terminal portion of a sample cut in the longitudinal direction into a tape (length 12 inch×width 3 inch) was fixed and suspended in the vertical direction, the other terminal portion in the longitudinal direction was contacted with a flame for 12 sec, the (1) burning time, (2) burning length, and (3) burning time of fallen burnt material were measured.

5. Moisture Vapor Transmission Rate

Measured according to ASTM D3833.

To be specific, $CaCl_2$ is added in a container specified by ASTM (flange outer size 50.8 mm×152.4 mm, inner size 25.4 mm×101.6 mm, container body size 25.4 mm×101.6 mm×38.1 mm (depth)) to a depth of about 3 mm below full. A sample cut in the same size as the outer size of the flange is adhered to the flange while avoiding wrinkles and bubbles. The sample is stood in an oven at 38° C.×humidity 95% RH for 24 hr, taken out, stood at room temperature for 15 min and the weight is measured (W1). The sample is again stood in an oven at 38° C.×humidity 95% RH for 72 hr, taken out, stood at room temperature for 15 min and the weight is measured again (W2). The WVTR (moisture vapor transmission rate) is calculated by the following formula [I].

$$WVTR\text{(moisture vapor transmission rate)}=(W2-W1)\times 2400/(T\times A) \quad \text{Formula [I]}$$

wherein T is an exposure time (72 hr), and A is an opening space (4 inch$^2$) of container.

6. Moisture Absorption Rate

A 1×4 inch sample is adhered to a 1.5×4 inch 2024 aluminum panel, preserved for 24 hr at 75° F. (23.9° C.)×humidity 50% RH, and the initial weight is measured. Thereafter, it is preserved at 120° F. (48.9° C.)×humidity 95% RH for 7 days, taken out, extra moisture and the like are wiped with gauze, and the weight is measured within 30 min after taking out. The moisture absorption rate was measured by comparison to the initial.

7. Linearity on Adhesion

A test and evaluation were performed by the aforementioned method (FIG. 4).

A glass plate was used as an adherend 50, a spring balance 51 was fastened in the center of a terminal portion (length 1 inch part) of the tape and the tape was pulled with 2 kg force. The test was performed at room temperature. When the width (W) of the minimum width part is greater than 23 mm, good (◯) was marked, and when it is 23 mm or below, failure (X) was marked.

Examples and Comparative Examples

Polyether-Based Polyurethane Adhesive

Polyether-based polyurethane (SP-210 manufactured by TOYO INK CO., LTD.) (100 parts by weight) is mixed with an isocyanate-based curing agent (T-510B manufactured by TOYO INK CO., LTD.) at 1.5 parts by weight, 2 parts by weight and 3 parts by weight to prepare three kinds of adhesive. The curing conditions of the adhesive were set to 120° C.×2 min.

Polyester-Based Polyurethane Adhesive

Polyester-based polyurethane (SH101 manufactured by TOYO INK CO., LTD.) (100 parts by weight) is mixed with an isocyanate-based curing agent (T-510B manufactured by TOYO INK CO., LTD.) at 2 parts by weight to prepare an adhesive. The curing conditions of the adhesive were set to 120° C.×2 min.

Substrate

As the substrates for Examples, three kinds of VLM-4001 with thickness 4 mil, VLM3301 with thickness 7 mil, and VLM3301 with thickness 10 mil, which are polyester-based polyurethane film substrates manufactured by American Polyfilm, Inc., were prepared.

As the substrate for Comparative Example 1, polyether-based polyurethane film substrate (thickness: 7 mil, trade name: MT2001) manufactured by American Polyfilm, Inc. was prepared.

Moisture-proof materials were prepared under the conditions (kind of substrate, substrate thickness, kind of adhesive, number of parts of curing agent, adhesive thickness) shown in Table 1 below, and the tensile strength and the elongation at break were measured. In Table 1, the number of parts of curing agent is the number of parts per 100 parts (parts by weight) of urethane. The obtained moisture-proof materials were subjected to the aforementioned tests. The results are shown in Table 2.

TABLE 1

|  | kind of substrate | substrate thickness mil | kind of adhesive | number of parts of curing agent part | adhesive thickness mil | tensile strength psi | elongation at break % | weight per unit area (oz/sqft) |
|---|---|---|---|---|---|---|---|---|
| Ex. 1 | polyester-based | 7 | polyether-based | 2 | 3 | 11500 | 790 | 1.11 |
| Ex. 2 | ↑ | ↑ | ↑ | ↑ | 2 | 10000 | 780 | 1.02 |
| Ex. 3 | ↑ | ↑ | ↑ | ↑ | 4 | 11000 | 780 | 1.22 |
| Ex. 4 | ↑ | ↑ | ↑ | ↑ | 5 | 9500 | 790 | 1.35 |
| Ex. 5 | ↑ | ↑ | ↑ | 3 | 3 | 10000 | 800 | 1.12 |
| Ex. 6 | ↑ | ↑ | ↑ | 1.5 | 3 | 9000 | 810 | 1.1 |
| Ex. 7 | ↑ | ↑ | ↑ | 2 | 1 | 9000 | 780 | 0.9 |
| Ex. 8 | ↑ | 4 | ↑ | ↑ | 3 | 8800 | 795 | 0.87 |
| Ex. 9 | ↑ | 10 | ↑ | ↑ | 3 | 13000 | 800 | 1.5 |
| Ex. 10 | ↑ | 7 | polyester-based | ↑ | 3 | 9000 | 800 | 1.15 |
| Comp. Ex. 1 | polyether-based | 7 | polyether-based | ↑ | 3 | 6900 | 880 | 1.09 |

Note:
"↑" shows the same value or meaning as one line above.

TABLE 2

|  | linearity on adhesion | room temperature × 50% RH | | 160° F. × 50% RH | | 120° F. × 95% RH | | moisture vapor transmission rate % | moisture absorption rate % | weight per unit area (oz/sqft) | burning time (sec) | burning length (inch) | burning time of fallen burnt material (sec) |
|---|---|---|---|---|---|---|---|---|---|---|---|---|---|
| | | adhesive force (lbs/inch) | adhesive residue | adhesive force (lbs/inch) | adhesive residue | adhesive force (lbs/inch) | adhesive residue | | | | | | |
| Ex. 1 | ◯ | 5.9 | absent | 7.9 | absent | 6.5 | absent | 5.5 | 0.1 | 1.11 | 1 | 2.5 | 0 |
| Ex. 2 | ◯ | 5.3 | absent | 7.7 | absent | 6 | absent | 6 | 0.1 | 1.02 | 2 | 2.8 | 0 |
| Ex. 3 | ◯ | 6.2 | absent | 8 | absent | 6.5 | absent | 5.4 | 0.1 | 1.22 | 1 | 3 | 0 |
| Ex. 4 | ◯ | 6.5 | absent | 8 | partially present | 6.6 | partially present | 5.2 | 0.1 | 1.35 | 2 | 2.5 | 0 |
| Ex. 5 | ◯ | 5 | absent | 7.5 | absent | 5.7 | absent | 6.6 | 0.1 | 1.12 | 1 | 2.8 | 0 |
| Ex. 6 | ◯ | 6.6 | absent | 8.3 | present | 7.2 | present | 5.2 | 0.1 | 1.1 | 2 | 3.1 | 0 |
| Ex. 7 | ◯ | 4.5 | absent | 6.8 | absent | 4.8 | absent | 7.7 | 0.1 | 0.9 | 1 | 2.5 | 0 |
| Ex. 8 | ◯ | 5.8 | absent | 7.7 | absent | 6.5 | absent | 5.4 | 0.1 | 0.87 | 1 | 2.6 | 0 |
| Ex. 9 | ◯ | 5.9 | absent | 7.8 | absent | 6.6 | absent | 5.6 | 0.1 | 1.5 | 2 | 3 | 0 |
| Ex. 10 | ◯ | 1.5 | absent | 7 | absent | 1.5 | present | 8.8 | 0.1 | 1.15 | 2 | 2.7 | 0 |
| Comp. Ex. 1 | X | 5 | present | 2 | present | 5.8 | absent | 4.8 | 0 | 1.09 | 2 | 2.7 | 0 |

The invention claimed is:

1. A moisture-proof material comprising a polyurethane film substrate and an adhesive layer formed on at least one surface of the substrate, which has a tensile strength of 8800-13000 psi and an elongation at break of 780-1500%,
    wherein the polyurethane film substrate consists of
    a polyurethane whose polyol component consists of polyester polyol,
    wherein the adhesive layer comprises a polyurethane adhesive,
    wherein the polyurethane adhesive comprises a curing agent, and
    wherein, when the moisture-proof material is cut into a tape T (1 inch width, 40 cm length), one end (1 inch length) of the tape T is adhered to a glass plate, and 30 cm in length of the tape T is adhered to the glass plate while pulling the other end of the tape along the axis direction of the tape T with a force of 2 kg, and the narrowest part of the tape T on the glass plate has a width larger than 23 mm.

2. The moisture-proof material according to claim 1, wherein the polyurethane adhesive is a polyether-based polyurethane adhesive.

3. The moisture-proof material according to claim 1, wherein the adhesive layer comprises a flame-retardant at a content of less than 5 wt %.

4. The moisture-proof material according to claim 1, which has a moisture vapor transmission rate of not more than 9.0%.

5. The moisture-proof material according to claim 1, which has a moisture absorption rate of not more than 1.0%.

6. The moisture-proof material according to claim 1, which shows a burning time of not more than 15 sec, a burning length of not more than 8 inch, and a burning time of a fallen burnt material of not more than 5 sec, in a flammability test.

* * * * *